(12) United States Patent
Shimizu et al.

(10) Patent No.: US 8,164,824 B2
(45) Date of Patent: Apr. 24, 2012

(54) DEMODULATOR

(75) Inventors: Takashi Shimizu, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 12/771,275

(22) Filed: Apr. 30, 2010

(65) Prior Publication Data

US 2010/0284059 A1 Nov. 11, 2010

(30) Foreign Application Priority Data

May 11, 2009 (JP) ................................. 2009-114868

(51) Int. Cl.
*G02F 2/00* (2006.01)
*H04B 10/04* (2006.01)

(52) U.S. Cl. ........ 359/325; 398/188; 398/201; 398/202; 398/212

(58) Field of Classification Search .......................... None
See application file for complete search history.

(56) References Cited

U.S. PATENT DOCUMENTS

| 7,411,725 | B2 * | 8/2008 | Suzuki et al. ................. 359/325 |
| 7,899,279 | B2 * | 3/2011 | Nasu et al. ...................... 385/14 |
| 8,068,273 | B2 * | 11/2011 | Shimizu et al. ............... 359/325 |
| 2007/0047966 | A1 | 3/2007 | Hironishi et al. |
| 2009/0148158 | A1 * | 6/2009 | Tsuritani et al. ................ 398/26 |

FOREIGN PATENT DOCUMENTS

JP 2007-67955 3/2007

* cited by examiner

*Primary Examiner* — Hemang Sanghavi
(74) *Attorney, Agent, or Firm* — Staas & Haley LLP

(57) ABSTRACT

A demodulator includes a splitter, a first dielectric substance, and a combiner. The splitter splits a differential phase shift keying optical signal into a first light beam and a second light beam and outputs the first light beam to a first optical path and the second light beam to a second optical path. The first dielectric substance is disposed in the first optical path and has a refractive index higher than the average refractive index of the second optical path. The combiner combines the first light beam and the second light beam and causes the beams to interfere with each other. The difference in length between the first and second optical paths and the refractive index of the first dielectric substance are set such that the first light beam is delayed by one bit with respect to the second light beam.

5 Claims, 11 Drawing Sheets

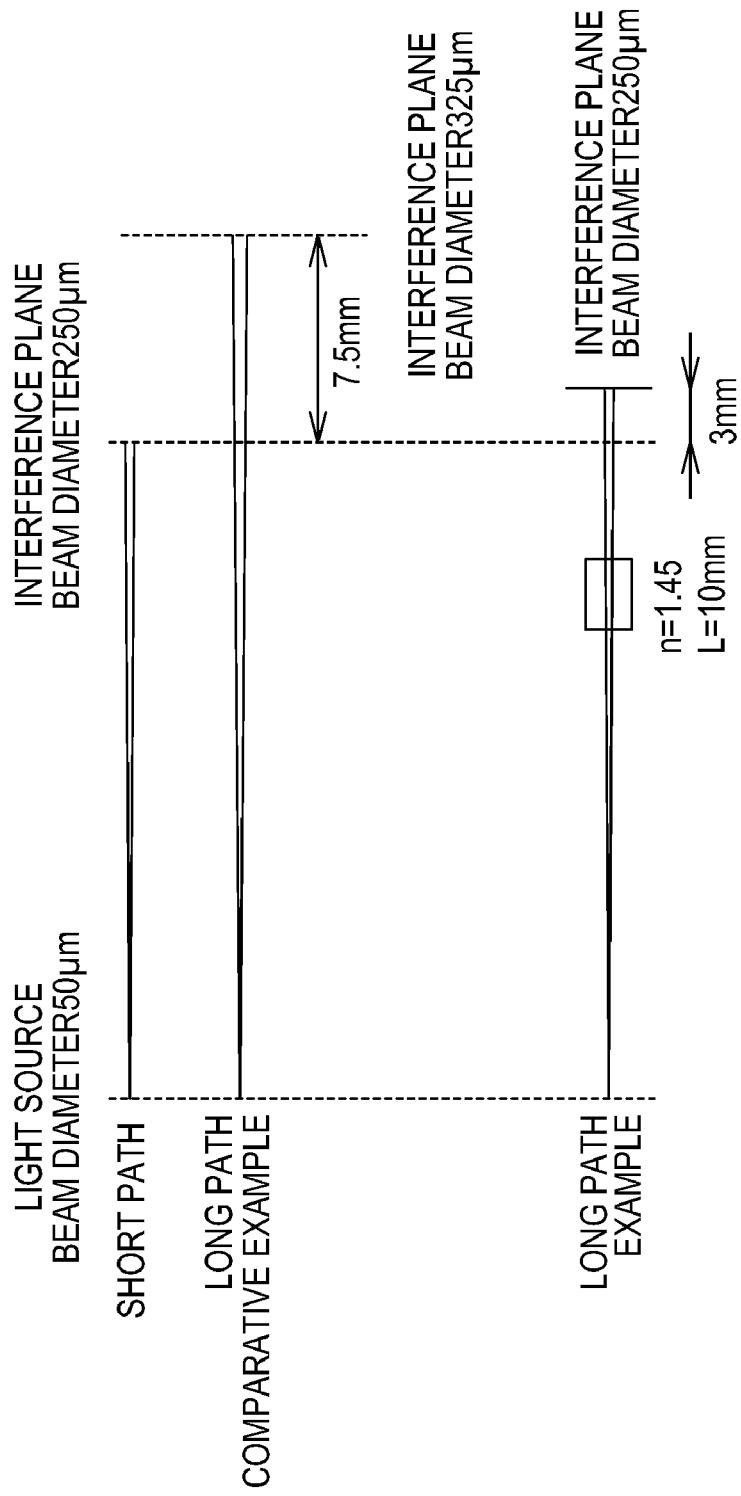

DEMODULATOR

CROSS-REFERENCE TO RELATED APPLICATIONS

This application is based upon and claims the benefit of priority of the prior Japanese Patent Application No. 2009-114868, filed on May 11, 2009, the entire contents of which are incorporated herein by reference.

BACKGROUND

1. Field

Various embodiments described herein relate to a demodulator.

2. Description of the Related Art

A demodulator splits a beam of light, provides the resulting beams with a time difference corresponding to one bit, and recombines them, in order to demodulate a signal by using a one-bit phase difference of light (see, Japanese Laid-open Patent Application Publication No. 2007-67955). In micro-optics, a difference is provided in the space propagation time. In this case, a beam of light propagating through a space increases in beam diameter due to diffraction. The longer the wavelength of propagating light, the more susceptible to diffraction it is. The smaller the beam diameter of propagating light, the more susceptible to diffraction it is.

However, the wavelengths used in fiber-optic communication are prescribed, and the wavelength cannot be freely selected. In order to prevent the beam divergence, the distance for which parallel light can be maintained can be increased by increasing the beam diameter.

However, increasing the beam diameter necessitates increasing the sizes of optical elements. In addition, the distance between the fiber end face and the lens needs to be increased. This increases the entire size of the device.

In recent years, communication modules have been reduced in size, and reduction in size of devices is strongly required. When a demodulator combines small-diameter beams that travel different distances to provide a necessary delay, residual light is generated due to the difference in beam diameter even when the power of light is desired to be zero. This deteriorates the extinction ratio (the on-off ratio).

In a demodulator, deterioration of extinction ratio leads to an increase in noise. Consequently, the extinction ratio is an important performance value specified in the requirement specifications. When a lens or the like is used to match different beam diameters, the phase front differs between two beams to be combined, and this also deteriorates the extinction ratio. Therefore, it is required to use thin beams, to match the beam diameters, and to match the phase fronts.

SUMMARY

A demodulator includes a splitter, a first dielectric substance, and a combiner. The splitter splits a differential phase shift keying optical signal into a first split light beam and a second split light beam and outputs the first split light beam to a first optical path and the second split light beam to a second optical path. The first dielectric substance is disposed in the first optical path and that has a refractive index higher than the average refractive index of the second optical path. The combiner combines the first split light beam traveling along the first optical path and the second split light beam traveling along the second optical path and causes the beams to interfere with each other. The difference in length between the first and second optical paths and the refractive index of the first dielectric substance are set such that the first split light beam traveling along the first optical path is delayed by one bit with respect to the second split light beam traveling along the second optical path.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

BRIEF DESCRIPTION OF THE DRAWINGS

FIG. 11 shows the results of an example and a comparative example.

DETAILED DESCRIPTION OF THE EMBODIMENTS

The embodiments of the present invention will now be described with reference to the drawings.

First Embodiment

Figure 1A:
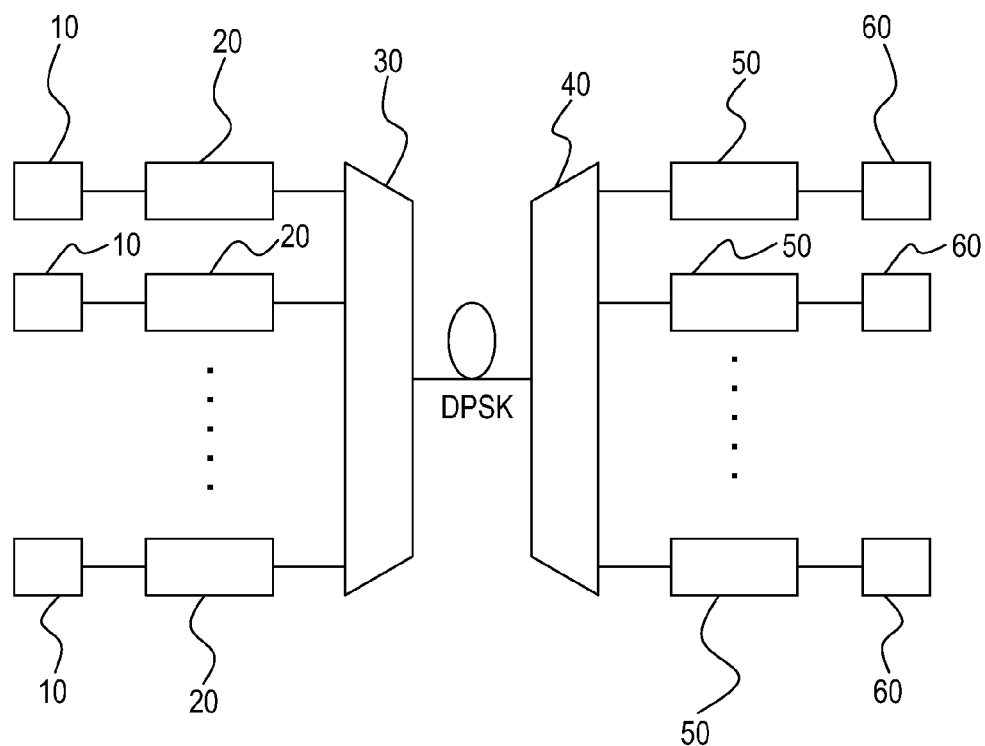
FIG. 1A shows the overall configuration of a differential phase shift keying optical transmission system including demodulators according to a first embodiment.
Figure 1B:
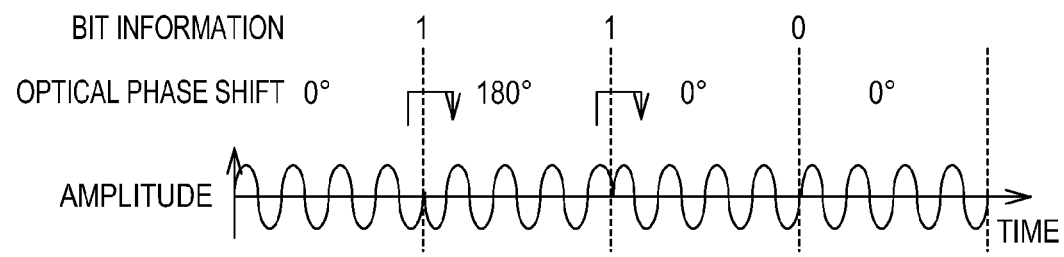
FIG. 1B shows a differential phase shift keying signal.

FIG. 1A shows the overall configuration of a differential phase shift keying (DPSK) optical transmission system 100 including demodulators 50 according to a first embodiment. FIG. 1B shows a differential phase shift keying signal.

As shown in FIG. 1A, the optical transmission system 100 includes a plurality of light sources 10, a plurality of phase modulators 20, a wavelength multiplexer 30, a wavelength demultiplexer 40, a plurality of demodulators 50, and a plurality of receivers 60.

The light sources 10 output optical signals different in wavelength from each other. The phase modulators 20 receive the optical signals output from the light sources 10. The phase modulators 20 generate phase modulation signals such as that shown in FIG. 1B from the optical signals received. The phase modulation signals generated by the phase modulators 20 are input into the wavelength multiplexer 30. The wavelength multiplexer 30 multiplexes the plurality of phase modulation signals input thereto. The multiplexed phase modulation signals are input into the wavelength demultiplexer 40 through an optical transmission path or the like.

The demodulators 50 demodulate demultiplexed phase modulation signals. Each demodulator 50 demodulates a phase modulation signal by causing the phase modulation signal and a signal delayed by one cycle (one bit) of the modulation rate of the phase modulation signal to interfere with each other. The signals combined and caused to interfere with each other by the demodulators 50 are received by the receivers 60. Through the above process, DPSK optical transmission is performed.

Figure 2A:
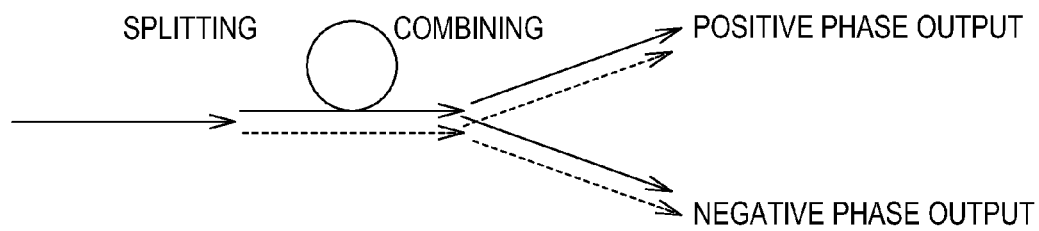
FIGS. 2A to 2D show divergence of light due to diffraction.

The increase in beam diameter of split light in the demodulators 50 will be described. As shown in FIG. 2A, an optical signal is split into a first split light beam shown by the solid line and a second split light beam shown by the dashed line, and the first split light beam is delayed by one bit with respect to the second split light beam.

Figure 2B:
Figure 2C:
Figure 2D:

As shown in FIG. 2B, both the first and second split light beams increase in diameter with propagation. The propagation distance of the first split light beam is longer than that of the second split light beam, and therefore the beam diameter of the first split light beam becomes larger than that of the second split light beam. In order to prevent the increase in beam diameter as shown in FIG. 2C, the beam diameter of the input light beam needs to be increased or the wavelength thereof needs to be reduced. However, increasing the beam diameter makes the device larger. If the beam diameter of the input light beam is reduced or the wavelength thereof is increased, the increase in beam diameter becomes significant as shown in FIG. 2D.

Figure 3A:
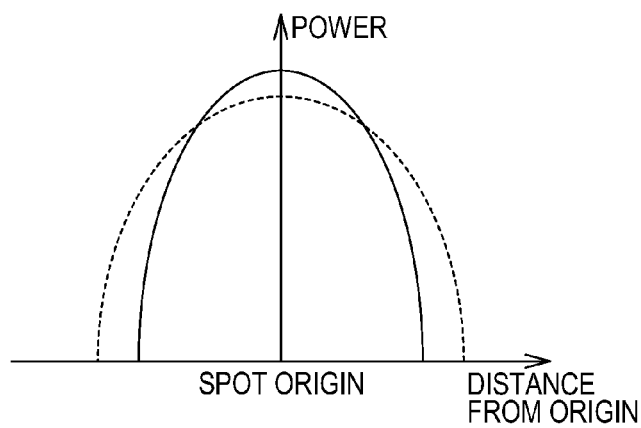
FIGS. 3A to 3C show residual light distribution in the case where two light beams having different beam diameters are caused to interfere with each other.
Figure 3B:
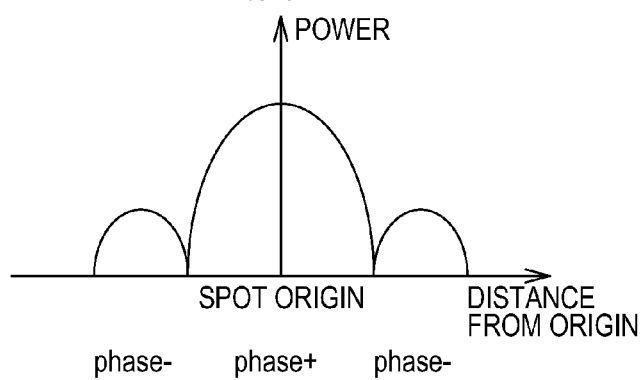
Figure 3C:
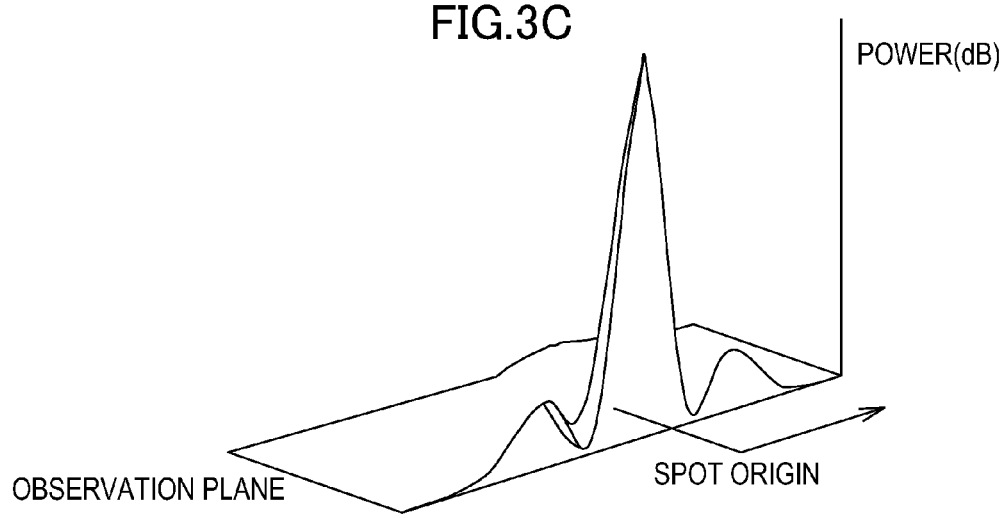

FIGS. 3A to 3C show residual light distribution in the case where two light beams having different beam diameters are caused to interfere with each other. As shown in FIG. 3A, two light beams having different beam diameters are caused to interfere with each other. In this case, as shown in FIGS. 3B and 3C, a distribution occurs in the residual light, and a plurality of phases are generated. In this case, the extinction ratio deteriorates.

Figure 4:
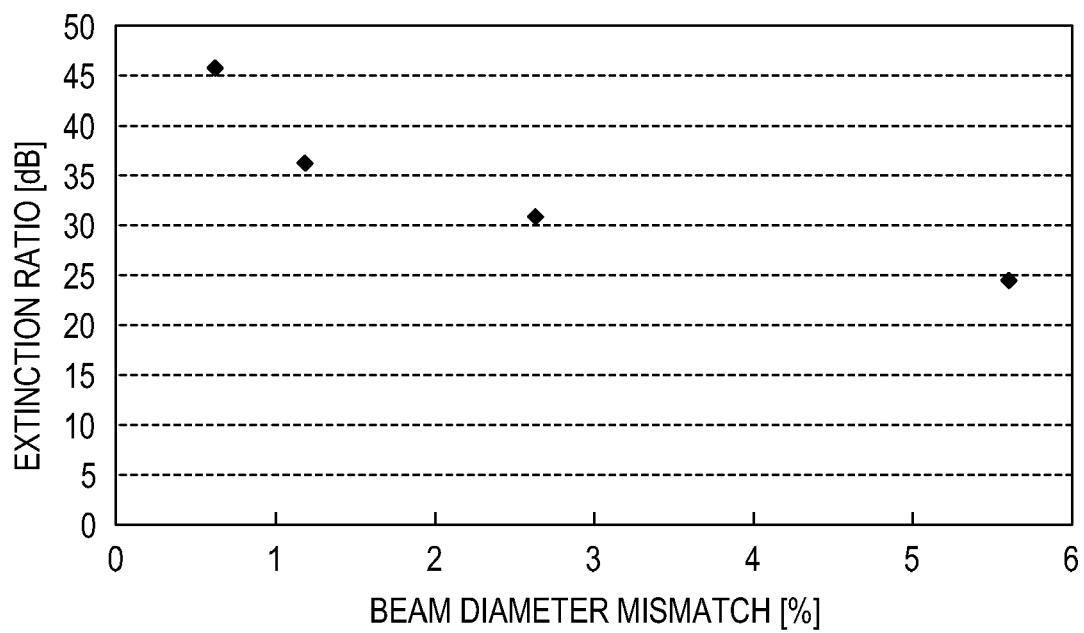
FIG. 4 shows the relationship between the beam diameter mismatch (%) of two light beams caused to interfere with each other and the extinction ratio.

FIG. 4 shows the relationship between the beam diameter mismatch (%) of two light beams caused to interfere with each other and the extinction ratio. As shown in FIG. 4, the extinction ratio deteriorates with the increase in beam diameter mismatch.

Figure 5:
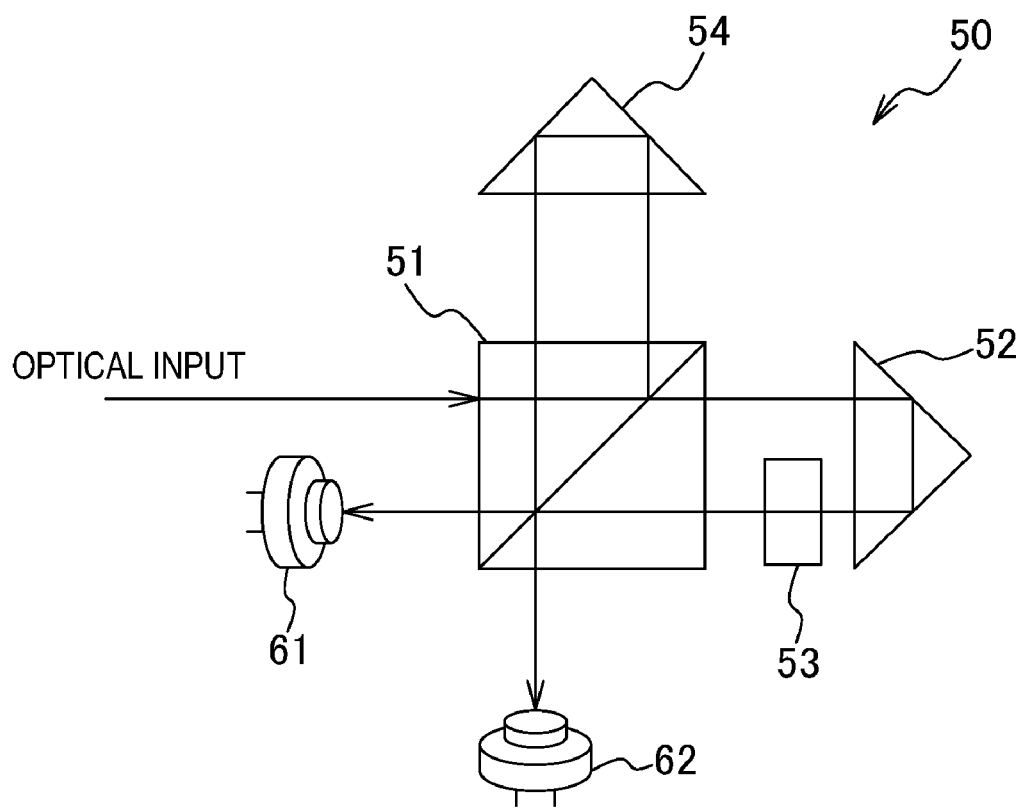
FIG. 5 shows a demodulator according to a first embodiment.

In this embodiment, the increase in beam diameter is prevented by disposing a dielectric substance in the optical path for delaying the split light beam by one bit. FIG. 5 shows a demodulator according to a first embodiment. The demodulator 50 is a Michelson demodulator. The demodulator 50 has a half mirror 51, a prism mirror 52, a dielectric substance 53, and a prism mirror 54.

The half mirror 51 functions as a splitter that splits the input light beam. The half mirror 51 splits the input light beam into a first split light beam traveling along a first optical path and a second split light beam traveling along a second optical path. The first split light beam is reflected by the prism mirror 52, passes through the dielectric substance 53, and is input into the half mirror 51 again. In this embodiment, the first optical path is a route that leads from the half mirror 51 to the prism mirror 52 and back again.

The second split light beam is reflected by the prism mirror 54 and is input into the half mirror 51 again. In this embodiment, the second optical path is a route that leads from the half mirror 51 to the prism mirror 54 and back again. In this embodiment, the difference in length between the first and second optical paths and the refractive index of the dielectric substance 53 are set such that the first split light beam traveling along the first optical path is delayed by one bit.

The half mirror 51 also functions as a combiner. The first split light beam that is input into the half mirror 51 along the first optical path combines and interferes with the second split light beam traveling along the second optical path, is thereafter output, and is received by a photodiode 61 of the receiver 60. The second split light beam that is input into the half mirror 51 along the second optical path combines and interferes with the first split light beam traveling along the first optical path, is thereafter output, and is received by a photodiode 62 of the receiver 60.

In this embodiment, the dielectric substance 53 is made of a transparent medium having a refractive index higher than the average refractive index of the second optical path. Therefore, in the case of propagation through the dielectric substance 53, the wavelength decreases in inverse proportion to the refractive index, compared to propagation along the second optical path. Therefore, the divergence angle of the first split light beam can be reduced. In addition, the propagation velocity decreases in proportion to the refractive index. By using these two properties of the dielectric substance 53, the beam diameter mismatch of the first and second split light beams at the time of combining and interference can be prevented, while providing a delay. As a result, the deterioration of extinction ratio can be prevented.

Figure 6:
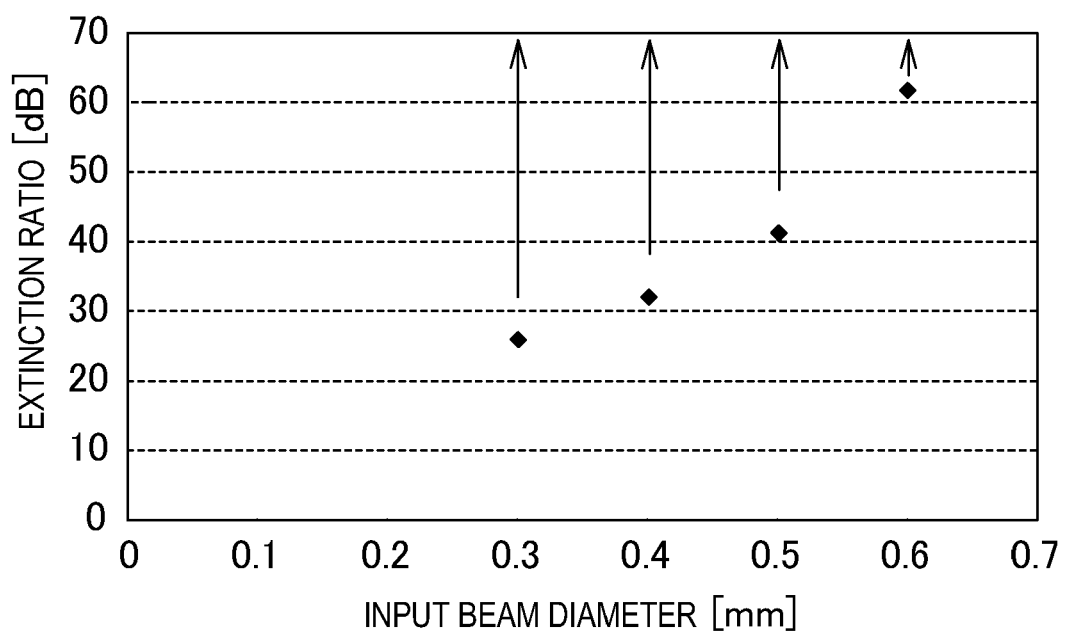
FIG. 6 shows the relationship between the beam diameter, propagation distance, and increase in beam diameter of input light.

FIG. 6 shows the advantage of this embodiment. As shown in FIG. 6, this embodiment can prevent the deterioration of extinction ratio regardless of the beam diameter of the input light. Therefore, the beam diameter of the input light can be reduced. Consequently, an increase in size of the device can be prevented.

A specific example of the dielectric substance 53 will be described. The length of the first optical path (long path) is denoted by $L_1$; the length of the second optical path (short path) is denoted by $L_2$; the distance that the first split light beam travels through the dielectric substance 53 is denoted by $L_n$; the refractive index of air is denoted by $n_{air}$; and the refractive index of the dielectric substance 53 is denoted by $n_{glass}$. The amount Delay of delay necessary for the demodulator 50 is expressed as follows:

$$\frac{(L_1 - L_n) \cdot n_{air} + L_n \cdot n_{glass} - L_2 \cdot n_{air}}{c} = Delay\Lambda \qquad (1)$$

where c is the velocity of light in vacuum.

The beam diameter immediately after the equal phase wave of a light beam output from a signal light input fiber is regulated with a collimator lens (Z=0) is denoted by $D_0$. If the light beam is transformed into an ideal planar Gaussian beam when Z=0, the beam diameter $D_z$ at an observation point at a distance Z from this interface in the propagation direction can be expressed as follows:

$$D_z = D_0 \sqrt{\frac{\pi^2 \cdot D_0^4 + \lambda^2 \cdot Z^2}{\pi^2 \cdot D_0^4}}$$

where $\lambda$ is the wavelength of input signal light.

Figure 7:
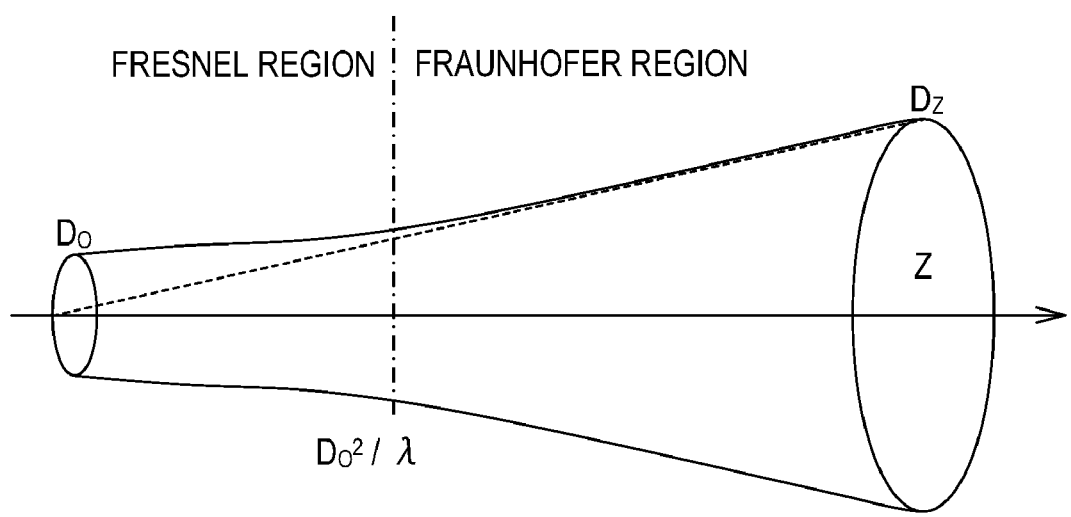
FIG. 7 shows the Fresnel and Fraunhofer regions and the border therebetween.

When the propagation distances L1 and L2 are sufficiently larger than $D_0^2/\lambda$, which provides an indication of the border between the Fresnel and Fraunhofer regions illustrated in FIG. 7, the divergence angle $\theta$ approaches a fixed value expressed as follows:

$$\theta = \frac{\lambda}{\pi \cdot D_0 \cdot n}$$

where n is the refractive index of the medium.

The beam diameter $D_z$ in this case can be expressed as follows:

$$D_z = Z \cdot \tan\left(\frac{\lambda}{\pi \cdot D_0 \cdot n}\right)$$

Therefore, the beam diameters $D_1$ and $D_2$ after propagating along the first optical path (long path) and the second optical path (short path) can be expressed as follows:

$$D_1 = L_n \cdot \tan\left(\frac{\lambda}{\pi \cdot D_0 \cdot n_{glass}}\right) + (L_1 - L_n) \cdot \tan\left(\frac{\lambda}{\pi \cdot D_0 \cdot n_{air}}\right) \Lambda \quad (2)$$

$$D_2 = L_2 \cdot \tan\left(\frac{\lambda}{\pi \cdot D_0 \cdot n_{air}}\right) \Lambda \quad (3)$$

The beam diameter mismatch can be brought to zero by setting the difference in length between the first and second optical paths and the refractive index of the dielectric substance 53 such that the beam diameter $D_1$ of the equation (2) is equal to the beam diameter $D_2$ of the equation (3). The deterioration of extinction ratio can thereby be prevented. As shown in FIG. 4, the extinction ratio can be improved to about 48 dB by reducing the beam diameter mismatch to 0.3% or less. In this case, a sufficient effect can be obtained if the extinction ratio necessary for the entire system is 30 dB or less.

Second Embodiment

Figure 8:
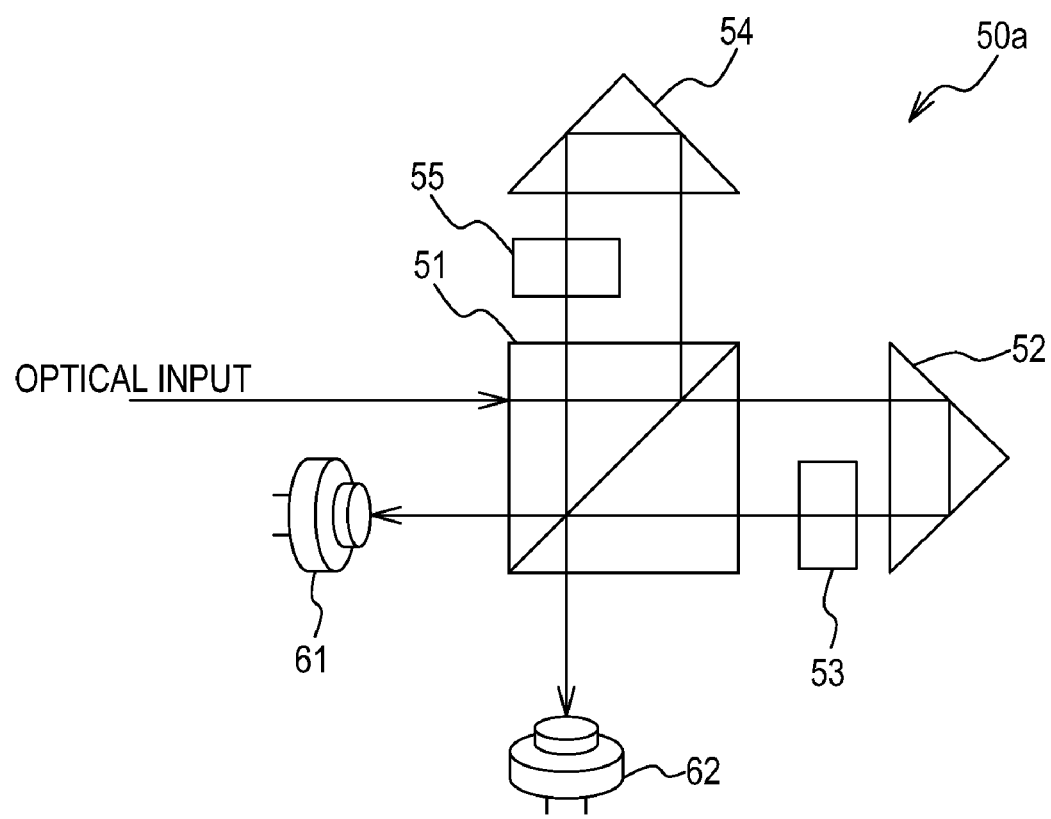
FIG. 8 shows a demodulator according to a second embodiment.

FIG. 8 shows a demodulator 50*a* according to a second embodiment. In the demodulator 50*a*, a dielectric substance 55 is disposed in the second optical path. The second split light beam that is split in the half mirror 51 is reflected by the prism mirror 54, passes through the dielectric substance 55, and is input into the half mirror 51 again. In this embodiment, the difference in length between the first and second optical paths and the refractive indices of the dielectric substances 53 and 55 are set such that the first split light beam traveling along the first optical path is delayed by one bit with respect to the second split light beam traveling along the second optical path. As described above, a dielectric substance may be disposed in the second optical path.

Also in this embodiment, the dielectric substance 53 is made of a transparent medium having a refractive index higher than the average refractive index of the second optical path. Therefore, by using the dielectric substance 53, the beam diameter mismatch of the first and second split light beams at the time of combining and interference can be prevented, while providing a delay. As a result, the deterioration of extinction ratio can be prevented.

Third Embodiment

Figure 9:
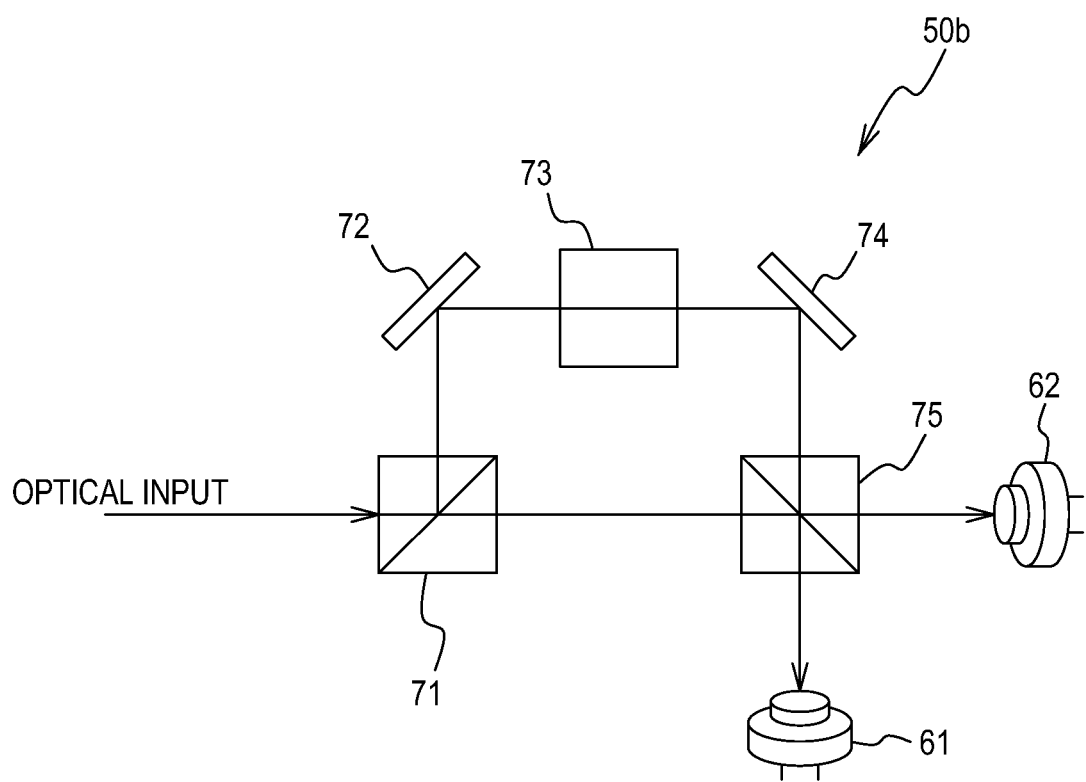
FIG. 9 shows a demodulator according to a third embodiment.

FIG. 9 shows a demodulator 50*b* according to a third embodiment. The demodulator 50*b* is a Mach-Zehnder demodulator. The demodulator 50*b* has a half mirror 71, a mirror 72, a dielectric substance 73, a mirror 74, and a half mirror 75.

The half mirror 71 functions as a splitter that splits the input light beam. The half mirror 71 splits the input light beam into a first split light beam traveling along a first optical path and a second split light beam traveling along a second optical path. The first split light beam is reflected by the mirror 72, passes through the dielectric substance 73, is reflected by the mirror 74, and is input into the half mirror 75. Therefore, the first optical path is a route from the half mirror 71 through the mirror 72, the dielectric substance 73, and the mirror 74 to the half mirror 75.

The second split light beam is input into the half mirror 75 without passing through the mirror 72, the dielectric substance 73, and the mirror 74. The second optical path is a route between the half mirror 71 and the half mirror 75. In this embodiment, the difference in length between the first and second optical paths and the refractive index of the dielectric substance 73 are set such that the first split light beam traveling along the first optical path is delayed by one bit.

The half mirror 75 functions as a combiner. The first split light beam that is input into the half mirror 75 along the first optical path combines and interferes with the second split light beam traveling along the second optical path, is thereafter output, and is received by the photodiode 61 of the receiver 60. The second split light beam that is input into the half mirror 75 along the second optical path combines and interferes with the first split light beam traveling along the first optical path, is thereafter output, and is received by the photodiode 62 of the receiver 60.

In this embodiment, the dielectric substance 73 is made of a transparent medium having a refractive index higher than the average refractive index of the second optical path. Therefore, by using the dielectric substance 73, the beam diameter mismatch of the first and second split light beams at the time of combining and interference can be prevented, while providing a delay. As a result, the deterioration of extinction ratio can be prevented.

Fourth Embodiment

Figure 10:
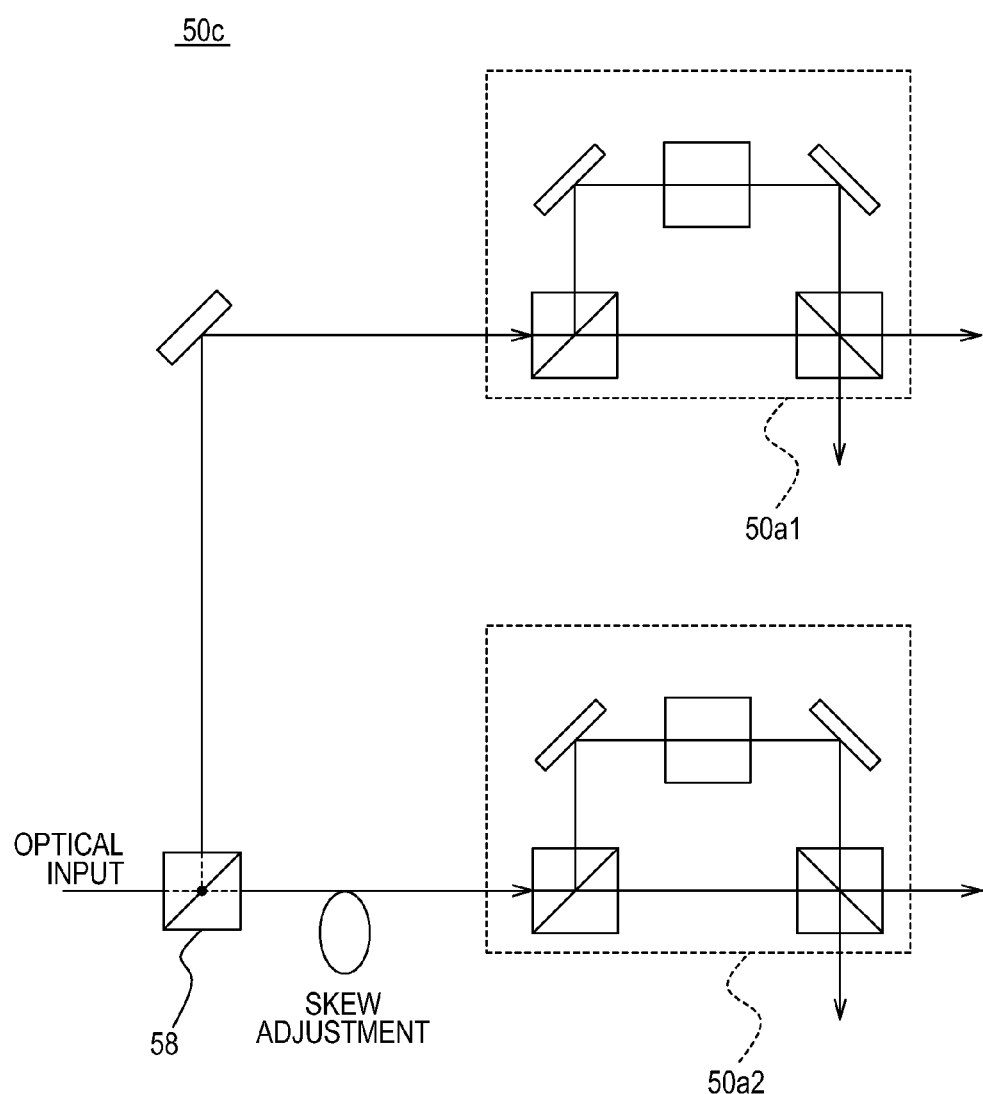
FIG. 10 shows a demodulator according to a fourth embodiment.

FIG. 10 shows a demodulator 50*c* according to a fourth embodiment. The demodulator 50*c* has a structure in which two demodulators (demodulators 50*a*1 and 50*a*2) according to any one of the first to third embodiments are provided. An optical signal is split into two, for example, by using a half mirror 58, and the resulting optical signals are input into the demodulators.

The skew adjustment is performed such that the relative phase difference between the optical signals input into the demodulators 50*a*1 and 50*a*2 at the optical frequency (for example, about 200 THz) is zero.

The demodulator 50*a*1 is set such that the optical path length difference is one bit and the phase difference at the optical frequency is $-\frac{1}{4}\lambda$ at the position where the first and second optical paths are combined and caused to interfere with each other. The demodulator 50*a*2 is set such that the optical path length difference is one bit and the phase difference at the optical frequency is $+\frac{1}{4}\lambda$ at the position where the first and second optical paths are combined.

The demodulator 50*c* in this embodiment demodulates a differential quadrature phase shift keying (DQPSK) modulated signal. As described above, demodulators according to any one of the first to third embodiments can be used as demodulators for a DQPSK signal.

EXAMPLE

A design example in the case where a demodulator has an FSR (free spectral range) of 40 GHz and the input beam diameter is 50 µm will be shown as an example. The total length of the second optical path (short path) is 25 mm in air. The beam diameter at the observation point in this case is calculated to be 250 µm from the equation (3). In the first optical path, a dielectric substance having a refractive index of 1.45 and a thickness of 10 mm is disposed. The total length of the first optical path is 28 mm. In this case, the beam diameter is calculated to be 250 µm from the equation (2), and the amount of delay is calculated to be 25 psec from the equation (1).

Comparative Example

In a comparative example, a dielectric substance is not disposed, and the amount of delay of the first optical path is provided by the propagation distance in air. In this case, the total length of the first optical path is 32.5 mm, and the beam diameter $D_1$ at the time of combining is 325 µm. Therefore, the ratio to the beam diameter of the second split light beam is 23.1%. In this case, the extinction ratio deteriorates to about 11 dB.

FIG. 11 shows the results of the example and the comparative example. Whereas the beam diameter mismatch increases in the comparative example, the beam diameter mismatch is prevented in the example. These results show that disposing a dielectric substance having a refractive index higher than the average refractive index of the second optical path in the first optical path prevents the beam diameter mismatch and the deterioration of extinction ratio.

Although the embodiments of the present invention have been described above in detail, the present invention is not limited to those specific embodiments, and various changes and modifications may be made therein without departing from the scope or spirit of the present invention as defined in the appended claims.

The demodulators disclosed in the specification can prevent the deterioration of extinction ratio without increasing in size.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A demodulator, comprising:
   a splitter that splits a differential phase shift keying optical signal into a first split light beam and a second split light beam, outputs the first split light beam to a first optical path, and outputs the second split light beam to a second optical path;
   a first dielectric substance that is disposed in the first optical path and that has a refractive index higher than the average refractive index of the second optical path; and
   a combiner that combines the first split light beam traveling along the first optical path and the second split light beam traveling along the second optical path and causes the beams to interfere with each other,
   wherein a difference in length between the first and second optical paths and the refractive index of the first dielectric substance are set such that the first split light beam traveling along the first optical path is delayed by one bit with respect to the second split light beam traveling along the second optical path.

2. The demodulator according to claim 1, further comprising a second dielectric substance that is disposed in the second optical path and that has a refractive index different from that of the first dielectric substance, wherein the difference in length between the first and second optical paths and the refractive indices of the first and second dielectric substances are set such that the first split light beam traveling along the first optical path is delayed by one bit with respect to the second split light beam traveling along the second optical path.

3. The demodulator according to claim 1, wherein the beam diameter mismatch of the first and second split light beams in the combiner is 0.3% or less.

4. The demodulator according to claim 2, wherein the beam diameter mismatch of the first and second split light beams in the combiner is 0.3% or less.

5. A demodulating method, comprising:
   splitting a differential phase shift keying optical signal into a first split light beam and a second split light beam, outputting the first split light beam to a first optical path, and outputting the second split light beam to a second optical path;
   disposing a first dielectric substance, which has a refractive index higher than the average refractive index of the second optical path, in the first optical path;
   combining the first split light beam traveling along the first optical path and the second split light beam traveling along the second optical path and causing the beams to interfere with each other; and
   setting a difference in length between the first and second optical paths and the refractive index of the first dielectric substance such that the first split light beam traveling along the first optical path is delayed by one bit with respect to the second split light beam traveling along the second optical path.

* * * * *